United States Patent Office 2,924,553
Patented Feb. 9, 1960

2,924,553

DIMETHYL 2,4-DICHLOROBENZOYL-PHOSPHONATE

Joseph W. Baker and George A. Saul, Nitro, W. Va., assignors to Monsanto Chemical Company, St. Louis, Mo., a corporation of Delaware No Drawing. Application September 18, 1956
Serial No. 610,647

3 Claims. (Cl. 167—30)

This invention relates to a new organic phosphorus compound, O,O-dimethyl 2,4-dichlorobenzoylphosphonate, and to nematocidal compositions containing this compound.

In accordance with this invention it has been found that O,O-dimethyl 2,4-dichlorobenzoylphosphonate destroys nematodes and other pests. The nematocidal activity is apparently a unique property of this compound. Increasing the size of the alkyl groups even to ethyl groups, reducing the number of chlorine atoms or altering their position either seriously reduces or eliminates toxicity to nematodes although the chlorine atoms may be replaced by bromine.

The desired compound may be obtained by the following procedure: To 69.8 parts by weight (0.33 mole) of 2,4-dichlorobenzoylchloride was added over a period of 20 minutes 41.3 parts by weight (0.33 mole) of trimethyl phosphite. The exothermic reaction was controlled by means of an ice bath at 25–35° C. The mixture was then heated slowly to 150° C. and held at 140–150° C. for one and one-half hours, the last half hour being under reduced pressure. The O,O-dimethyl 2,4-dichlorobenzoylphosphonate, an amber liquid, was obtained in quantitative yield. Analysis gave 12.6% phosphorus and 24.7% chlorine as compared to 10.9% phosphorus and 25.0% chlorine calculated for $C_9H_9Cl_2O_4P$ To illustrate the nematocidal value of the new compound a suspension of the nematode *Panagrellus redivivus* in water was prepared and the motility of the organism in the presence of 0.1% of the test material observed through a microscope. The motility after 24 hours exposure to O,O-dimethyl 2,4-dichlorobenzoylphosphonate was reduced to zero.

In another test, heat sterilized soil is infested with nematodes (Meloidogyne sp.) and different portions treated with solutions containing concentrations of 0.1 and 0.01% by weight of O,O-dimethyl 2,4-dichlorobenzoylphosphonate. After standing for a week, two-week old tomato plants are transplanted in the test soil and also in untreated, heat-sterilized soil. The plants are allowed to grow for two months, then harvested and the roots washed and examined. The results showed no nematode infestation.

In actual usage the nematocides may be added to the soil in solution, as an emulsion or water dispersion, or in a solid formulation wherein the active nematocide is distributed over some dry and permanently free-flowing powder such as the clays, including bentonite and attapulgite, or such materials as talc, diatomaceous earth, fuller's earth, chalk, calcium carbonate and the like. These diluents normally comprise more than 50% up to 98% of the complete formulation and thereby provide a means of more even distribution of the active material over a wider area and in the effective quantities required. These nematocidal compositions will attack the soil phase of the life cycle of nematode parasites which infest animals. Treating barn yards, chicken pens, stables and other infested areas destroys eggs and also infective larvae of many parasites which infest animals. Moreover, the compositions are effective for the control of nematodes in their environment which includes bodies of animals.

In the use as a nematocide or soil fumigant the active compound, diluted or undiluted, may be applied to the soil at rates of 10 to 500 pounds per acre. The preferred application for treating soils of average nematode infection will be from 25 to 100 pounds per acre. The formulation may contain dispersants which aid uniform distribution.

It is intended to cover all changes and modifications of the examples of the invention herein chosen for purposes of disclosure which do not constitute departures from the spirit and scope of the invention.

What is claimed is:

1. As a new compound O,O-dimethyl 2,4-dichlorobenzoylphosphonate.

2. A nematocidal composition comprising a major proportion of a carrier and a minor but effective concentration of O,O-dimethyl 2,4-dichlorobenzoylphosphonate.

3. The method of destroying parasitic worm life in agricultural soils which comprises contacting the said organisms with a nematocidal composition comprising an effective concentration of O,O-dimethyl 2,4-dichlorobenzoylphosphonate.

References Cited in the file of this patent
UNITED STATES PATENTS

| | | |
|---|---|---|
| 2,516,168 | Woodstock | July 25, 1950 |
| 2,535,172 | Tawney | Dec. 26, 1950 |
| 2,750,324 | Bender | June 12, 1956 |
| 2,769,743 | Mattson | Nov. 6, 1956 |

OTHER REFERENCES

Kabachnik et al.: "Bull. Acad. Sci. U.S.S.R., Classe, Sci. Chim., pp. 364–374 (1945) (in Russian).